United States Patent
Song et al.

(10) Patent No.: US 10,532,253 B2
(45) Date of Patent: Jan. 14, 2020

(54) POLYURETHANE-IONOMER HYBRID RESIN COMPOSITION FOR GOLF BALL COVER AND GOLF BALL INCLUDING COVER FORMED USING THE SAME

(71) Applicant: VOLVIK INC., Chungcheongbuk-do (KR)

(72) Inventors: Chul Ho Song, Gyeonggi-do (KR); In Hong Hwang, Gyeonggi-do (KR); Kyung Ahn Moon, Seoul (KR)

(73) Assignee: VOLVIK INC., Chungcheongbuk-do (KR)

(*) Notice: Subject to any disclaimer, the term of this patent is extended or adjusted under 35 U.S.C. 154(b) by 35 days.

(21) Appl. No.: 15/657,814

(22) Filed: Jul. 24, 2017

(65) Prior Publication Data

US 2018/0147452 A1    May 31, 2018

(30) Foreign Application Priority Data

Nov. 25, 2016 (KR) .................. 10-2016-0157944

(51) Int. Cl.
| | | |
|---|---|---|
| *A63B 37/12* | (2006.01) | |
| *C08L 23/08* | (2006.01) | |
| *A63B 37/00* | (2006.01) | |
| *A63B 45/00* | (2006.01) | |

(52) U.S. Cl.
CPC ...... *A63B 37/0023* (2013.01); *A63B 37/0031* (2013.01); *A63B 45/00* (2013.01); *C08L 23/0876* (2013.01); *C08L 2205/03* (2013.01)

(58) Field of Classification Search
None
See application file for complete search history.

(56) References Cited

U.S. PATENT DOCUMENTS

| | | | |
|---|---|---|---|
| 6,242,521 B1* | 6/2001 | Hwang | A63B 37/0003 473/373 |
| 6,663,507 B1 | 12/2003 | Watanabe et al. | |
| 2011/0152008 A1 | 6/2011 | Kim et al. | |
| 2011/0152010 A1* | 6/2011 | Kim | A63B 37/0003 473/377 |

FOREIGN PATENT DOCUMENTS

| | | |
|---|---|---|
| JP | 2011136160 A | 7/2011 |
| KR | 10-0879979 B1 | 1/2009 |

OTHER PUBLICATIONS

"An Inside Lokk at Ionomers"; How Polymers Work—Polymer Science Learning Center (2003) pp. 1-6. (Year: 2003).*

* cited by examiner

*Primary Examiner* — David J Buttner
(74) *Attorney, Agent, or Firm* — Mintz Levin Cohn Ferris Glovsky and Popeo, P.C.; Peter F. Corless

(57) ABSTRACT

A polyurethane-ionomer hybrid resin composition for a golf ball cover having excellent elastic reaction force and backspin performance comprises 100 parts by weight of a modified ionomer having a number average molecular weight in a range of 1,000 to 2,400, provided as a reaction product generated by a reaction among a polyol including hydroxyl groups on opposing ends of the polyol, a monomer of acrylic acid or methacrylic acid having 2 to 3 functional groups, and zirconia, and modified in such a manner that a polyester oligomer in a zirconia complex state and a zirconia filled state is added to an ionomer resin to be reacted, and a portion of unsaturated carboxylic acid of an ionomer is neutralized to be zirconium and additionally polymerized to be the polyester oligomer; 20 to 40 parts by weight of a block polyurethane prepolymer with respect to 100 parts by weight of the modified ionomer; 70 to 100 parts by weight of the ionomer with respect to 100 parts by weight of the modified ionomer; and 1 to 10 parts by weight of a chain extender with respect to 100 parts by weight of the block polyurethane prepolymer.

11 Claims, 1 Drawing Sheet

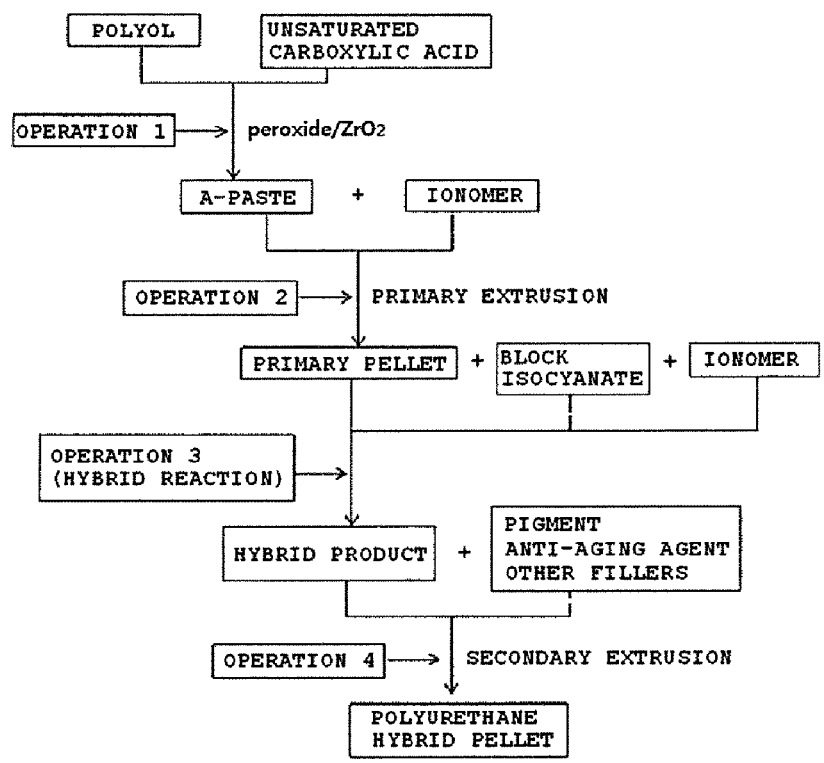

POLYURETHANE-IONOMER HYBRID RESIN COMPOSITION FOR GOLF BALL COVER AND GOLF BALL INCLUDING COVER FORMED USING THE SAME

CROSS-REFERENCE TO RELATED APPLICATION

This application claims the benefit of priority to Korean Patent Application No. 10-2016-0157944, filed on Nov. 25, 2016 with the Korean Intellectual Property Office, the entirety of which is incorporated herein by reference.

BACKGROUND

The present disclosure relates to a composition for a golf ball cover having high elasticity and backspin performance and to a golf ball including a cover formed using the composition.

Current premium level golf ball covers provided on golf balls commonly used by advanced amateur players or professional golfers may be formed using a dual layer cover including an external cover and an inner cover. In the dual layer cover described above, the inner cover is formed using a relatively strong, solid ionomer resin having a relatively high level of elasticity. The external cover is formed using a soft, durable polyurethane resin. In a case in which the dual layer cover is combined with a single core, a three-piece golf ball may be formed. In a case in which the dual layer cover is combined with a dual core, a four-piece golf ball may be formed.

As an ionomer having a relatively high level of strength and elasticity in order to primarily protect an inner core of an elastic body and to increase driving distance, an ionomer resin ('Surlyn®' by DuPont is commonly used) formed in such a manner that a polyethylene-acrylic acid copolymer is neutralized by a metal ion has been applied to use in a golf ball cover.

However, in a round of golf, not only driving distance, but also control performance (backspin power) capable of accurately stopping a golf ball on the green when a golf ball is hit with a short iron is critical. To this end, in the case of premium level golf balls, golf balls including a dual layer cover having an ionomer resin as an inner cover, as described above, and a polyurethane layer formed thereon as an external cover, have been manufactured. A polyurethane layer forming an external cover may have soft, durable properties. In the case of a polyurethane layer, it is easy to put backspin on a golf ball, so that a polyurethane layer is appropriate as a material for an external cover.

In terms of golf balls having a dual layer cover structure described above, given the current situation in which elasticity and spin force are simultaneously demanded, the use of a material described above is inevitable. Alternative materials simultaneously satisfying requirements for elasticity and the ability to impart spin force to substitute a material for the related art have not yet been developed.

In the meantime, golf balls having a dual layer cover structure may be manufactured in such a manner that an ionomer resin is first melted at a temperature of 200° C. or higher to be disposed on a core of a golf ball, in order to form an inner cover using injection molding; the inner cover is sufficiently cooled at room temperature for at least one day to evenly polish a surface thereof; and a urethane resin is cast using a casting method to form an external cover. As such, the manufacturing process of golf balls having a dual layer cover structure may be complicated and may require a significant amount of time, so that productivity thereof is relatively low.

In addition, in the case of golf balls having such a dual layer cover structure, a thickness of a dual layer cover is formed to be about 2 mm. An inner cover and an external cover are manufactured using two materials using two processes, so that a thickness of a cover layer may be increased to be greater than necessary. Such thicknesses of an inner cover and an external cover may affect the performance of golf balls. When thicknesses thereof are increased, the percentage of an inner core is relatively reduced. Thus, the overall performance thereof, such as feel, resilience, and back spin, may be degraded.

However, main materials of a dual layer cover formed using an ionomer and polyurethane have a certain level of limitations in reducing a thickness thereof, due to characteristics of a casting process in which the main materials are used.

Thus, novel materials, that is, materials simultaneously implementing elasticity and spin are demanded in various aspects.

The prior art related to an exemplary embodiment includes 'Golf Ball Cover Composition,' Korean Patent No. 0281227. The document described above describes a technique in which a polyester oligomer in a zirconia complex state and a zirconia filled state is added to an ionomer resin to be mixed and reacted therewith, so that a portion of unsaturated carboxylic acid in an ionomer resin may be neutralized to be another metal including zirconium and may be additionally polymerized to be an ester, in order to modify and transform an ionomer of the related art.

SUMMARY

An aspect of the present disclosure provides a polyurethane-ionomer hybrid cover composition as a cover composition implementing characteristics similar to those of a golf ball having a dual layer cover structure of the related art, using a single layer cover.

According to an aspect of the present disclosure, a polyurethane-ionomer hybrid resin composition for a golf ball cover is provided, the composition comprising 100 parts by weight of a modified ionomer having a number average molecular weight in a range of 1,000 to 2,400, provided as a reaction product generated by a reaction among a polyol including hydroxyl groups on opposing ends of the polyol, a monomer of acrylic acid or methacrylic acid having 2 to 3 functional groups, and zirconia, and modified in such a manner that a polyester oligomer in a zirconia complex state and a zirconia filled state is added to an ionomer resin to be reacted, and a portion of unsaturated carboxylic acid of an ionomer is neutralized to be zirconium and additionally polymerized to be the polyester oligomer; 20 to 40 parts by weight of a block polyurethane prepolymer with respect to 100 parts by weight of the modified ionomer; 70 to 100 parts by weight of the ionomer with respect to 100 parts by weight of the modified ionomer; and 1 to 10 parts by weight of a chain extender with respect to 100 parts by weight of the block polyurethane prepolymer.

The polyol is at least one selected from a group consisting of a polyester diol obtained by polycondensation of at least one dibasic acid selected from a group consisting of adipic acid and sebacic acid and at least one diol selected from a group consisting of ethylene glycol, propylene glycol, butanediol, and hexanediol, or interesterification; a polyether diol obtained by adding an epoxide to at least one selected from a group consisting of ethylene oxide and butylene oxide; polyalkylene oxide (an alkylene included in the polyalkylene oxide has a carbon number of 2 to 4); a polytetramethylene ether glycol obtained by polymerization of tetrahydrofuran; a modified polyether diol in which the polyether diol or the polytetramethylene ether glycol is modified into acrylonitrile; a polyoxyethylene diol; a polycaprolactone diol; and a polycarbonate diol.

The monomer of acrylic acid or methacrylic acid having 2 to 3 functional groups may be at least one selected from a group consisting of ethylene diacrylate, ethylene dimethacrylate, trimethylolpropane trimethacrylate, and trimethylolpropane triacrylate.

The zirconia may be provided as zirconia in which at least one selected from a group consisting of yttrium oxide ($Y_2O_3$), calcium oxide (CaO) and magnesium oxide (MgO) is added to zirconium oxide ($ZrO_2$) to partially stabilize a crystal structure of the zirconia. In this case, the zirconia may be provided as powder having a particle size of 250 mesh or less and may include 0.01 wt % to 2 wt % of hafnium oxide ($HfO_2$).

The ionomer resin may be provided as an ionic ethylene-based copolymer resin in which ethylene is combined with unsaturated carboxylic acid, and a portion of the unsaturated carboxylic acid is combined with at least one metal among lithium (Li), sodium (Na), Magnesium (Mg), calcium (Ca), and zinc (Zn) to be neutralized to have a degree of neutralization of 20 wt % to 80 wt %.

The ionic ethylene-based copolymer resin may be provided as a copolymer including three components of ethylene, an unsaturated carboxylic acid, and an unsaturated carboxylic acid metal salt or including four components of ethylene, an unsaturated carboxylic acid, an unsaturated carboxylic acid ester, and an unsaturated carboxylic acid metal salt.

In this case, the unsaturated carboxylic acid may be at least one selected from a group consisting of acrylic acid, methacrylic acid, maleic acid, and fumaric acid. The unsaturated carboxylic acid metal salt may be at least one selected from a group consisting of acrylic acid, methacrylic acid, maleic acid, and fumaric acid, in the same manner as the unsaturated carboxylic acid. A metal of the unsaturated carboxylic acid metal salt may be at least one selected from a group consisting of Na, lithium (Li), potassium (K), Zn, and magnesium (Mg).

In the meantime, the unsaturated carboxylic acid ester may be provided as an alkyl ester of the unsaturated carboxylic acid, and an alkyl group included in the alkyl ester may have a carbon number of 1 to 10.

The block polyurethane prepolymer may be provided as a block polyurethane prepolymer in which an isocyanate on opposing ends of a polyurethane obtained by a reaction between a polyol and the isocyanate is blocked by at least one selected from a group consisting of a phenol, s-caprolactam, 1,2,4-triazole, pyrazole, acetone oxime, cyclohexanone oxime, methyl ethyl ketoxime (MEKO), dialkyl malonate (an alkyl group thereof has a carbon number of 1 to 3), and a hydroxamic acid ester.

In this case, the block polyurethane prepolymer may be obtained in such a manner that the polyol and the isocyanate are reacted to have a mole ratio in a range of 1:1.2 to 1:1.5.

The block polyurethane prepolymer may include at least one soft segment selected from a diol selected from a group consisting of ethylene glycol, neopentyl glycol, propylene glycol, hexylene glycol, 1,6-hexanediol, triethylene glycol, and bisphenol A; a polyfuntional alcohol of glycerol; a polyester polypol selected from a group consisting of trimethylpropionic acid, benzoic acid, adipic acid, phthalic acid, and isophthalic acid; hydroxyacrylate selected from a group consisting of hydroxyethyl acrylate, hydroxyethyl methacrylate, and hydroxybutyl acrylate; and a polyether polyol of polytetramethylene ether glycol (PTMEG).

The block polyurethane prepolymer may include at least one hard segment selected from an aromatic isocyanate selected from a group consisting of diphenylmethane diisocyanate (MDI), toluene diisocyanate (TDI), naphthalene diisocyanate (NDI), tolidine diisocyanate (TODI), and p-phenylene diisocyanate (PPDI); and an aliphatic isocyanate selected from a group consisting of hexamethylene diisocyanate (HDI), isophorone diisocyanate (IPDI), and 4,4'-dicyclohexylmethane diisocyanate (H12MDI).

In the meantime, the chain extender may be at least one selected from a group consisting of ethylene glycol, 1,4-butanediol, ethylene diamine, and hexamethylene diamine.

According to an aspect of the present disclosure, a golf ball is provided, and the golf ball comprises a core; and a cover formed using one of a polyurethane-ionomer hybrid resin composition for a golf ball cover, on an external side of the core. The core may be provided as a single core or a dual core.

In this case, the cover may be provided as a single layer cover, a dual layer cover, or a triple layer cover.

BRIEF DESCRIPTION OF DRAWINGS

The above and other aspects, features, and advantages of the present disclosure will be more clearly understood from the following detailed description when taken in conjunction with the accompanying drawings, in which:

FIG. 1 is a schematic view illustrating a method of manufacturing a polyurethane-ionomer hybrid cover composition according to an exemplary embodiment.

DETAILED DESCRIPTION

According to an exemplary embodiment, a golf ball cover composition having a single layer cover, securing relatively long driving distance when a golf ball is hit using a golf driver, having excellent backspin performance when the golf ball is hit using a short iron, providing a soft feel when being hit, while having durability, and a golf ball including a cover formed using the golf ball cover composition may be provided.

In other words, a cover composition according to an exemplary embodiment is provided as a single layer cover. The golf ball cover composition allows for the characteristics of a dual layer cover of the related art, formed using polyurethane and an ionomer, to be implemented. The cover composition of an exemplary embodiment is provided as a resin composition including urethane and the ionomer. Hereinafter, an exemplary embodiment will be described in more detail.

According to an exemplary embodiment, a polyurethane-ionomer hybrid resin composition for a golf ball cover may be formed using an ionomer resin having a form in which a polyethylene-acrylic acid copolymer commonly used as an inner cover material for a golf ball having a dual layer cover of the related art is neutralized, and using a polyurethane resin commonly used as an external cover material. A resin composition containing integrated polyurethane-ionomer hybrid induced by a chemical combination between the ionomer and the polyurethane may be provided as a cover composition. A cover layer may be formed on an exterior of a core of the golf ball using the cover composition, thereby providing a golf ball having a single cover layer.

According to an exemplary embodiment, in the polyurethane-ionomer hybrid resin composition for a golf ball cover, the ionomer resin may be used by being first modified using a compound of zirconia, a polyester oligomer, and a polyol. Modification of the ionomer may be performed in such a manner that a plurality of free carboxylic acids in the ionomer resin are induced to an ester polyol, in order to be sufficiently reacted with an isocyanate, and the ionomer resin is reacted with urethane at a relatively high temperature at which fluidity of the ionomer resin is sufficiently secured. In this case, a block polyurethane prepolymer may be used as the urethane. Thus, a polyurethane-ionomer hybrid material may be obtained. In a case in which a golf ball is manufactured using a resin composition, obtained using a method described above, as a golf ball cover, a golf ball having characteristics of urethane and the ionomer, which are strong and have a relatively high level of elasticity, may be manufactured.

In the case of a polyurethane-ionomer hybrid resin for a golf ball cover described above, in general, a commercially available ionomer may be modified first using a polyester oligomer in a metal complex state and a metal filled state.

In other words, in an exemplary embodiment, an ionomer resin currently commercially available may be modified to be used. In general, the ionomer resin commercially available have been manufactured in such a manner that a portion of unsaturated carboxylic acid is neutralized using a metal, such as lithium (Li), sodium (Na), magnesium (Mg), calcium (Ca), and zinc (Zn). In an exemplary embodiment, a portion of unsaturated carboxylic acid may be neutralized using a different metal from a metal described above in the ionomer of the related art. For example, the different metal may be provided as zirconium (Zr). Zirconia may act as a catalyst for esterification, while Zr may neutralize the portion of unsaturated carboxylic acid of the ionomer. Thus, the polyester oligomer in a state in which a metal is complex (a metal complex state) or in a state in which zirconia is filled may be formed in such a manner that unsaturated carboxylic acid of the ionomer is neutralized by zirconia, thereby being used as a soft, durable material for a golf ball cover, as compared with the ionomer resin of the related art.

In an exemplary embodiment, the polyester oligomer in the metal complex state and in the metal filled state may also be referred to as 'A-paste' for the sake of convenience. Chemicals to manufacture an A-paste used in an exemplary embodiment may comprise a polyol including hydroxyl groups on opposing ends of the polyol having a molecular weight in a range of 1,000 to 2,400, a monomer including 2 to 3 functional groups of acrylic acid and methacrylic acid, and zirconia, a metallic compound. An organic peroxide may be used as a reaction initiator for a reaction among the polyol, the monomer, and the zirconia.

The polyol may be provided as a polyol including hydroxyl groups on opposing ends thereof. In detail, the polyol may be provided as a polyester diol obtained by polycondensation of dibasic acid, such as adipic acid and sebacic acid, and a diol, such as ethylene glycol, propylene glycol, butanediol, and hexanediol, or interesterification; a polyether diol obtained by adding an epoxide to ethylene oxide or butylene oxide; a polyalkylene glycol (an alkylene included in the polyalkylene glycol has a carbon number of 2 to 4); a polytetramethylene ether glycol obtained by polymerization of tetrahydrofuran; a modified polyether diol in which the polyether diol, the polyalkylene glycol, or the polytetramethylene ether glycol is modified into acrylonitrile, or the like; a polycaprolactone diol; and a polycarbonate diol.

As an acrylic monomer or a methacrylic monomer having 2 functional groups or 3 functional groups, a monomer having 2 functional groups or 3 functional groups, such as ethylene diacrylate, ethylene dimethacrylate, trimethylol propane trimethacrylate, and trimethylol propane triacrylate, may be provided.

In addition, zirconia, a metal oxide, may be provided in such a manner that yttrium oxide ($Y_2O_3$) is added to zirconium oxide ($ZrO_2$), and a crystal structure thereof is partially stabilized to be pulverized, stabilized by adding calcium oxide (CaO), or stabilized by adding magnesium oxide (MgO). The zirconia may include hafnium oxide ($HfO_2$) of about 0.01 wt % to about 2 wt %.

The zirconia is not specifically limited, but an average size of a pulverulent body may be less than a size able to pass through a 250-mesh sieve. In other words, a size of a particle thereof may be 250 mesh or less.

As an organic peroxide, the reaction initiator, a benzoyl peroxide, azo bis isobutyronitrile (AIBN), a dicumyl peroxide, 2,5-dimethylhexyl-2,5-di (tert-butyl peroxybenzoate), 1,1-di-tert-butyl-peroxy-3,3,5-trimethylcyclohexane, bis (tertiary-butylperoxyisopropyl) benzene, or the like, may be used.

The ionomer resin is provided as an ionic ethylene-based copolymer resin in which unsaturated carboxylic acid is combined with ethylene, and a portion of unsaturated carboxylic acid is neutralized to be a metal salt state. The ionomer resin may be provided as a copolymer including three components of ethylene, an unsaturated carboxylic acid, and an unsaturated carboxylic acid metal salt or including four components of ethylene, an unsaturated carboxylic acid, unsaturated carboxylic acid ester, and an unsaturated carboxylic acid metal salt.

Among components described above, a monobasic acid, such as acrylic acid or methacrylic acid, may be used, while a dibasic acid, such as maleic acid or fumaric acid, may be used, as an unsaturated carboxylic acid. More specifically, the monobasic acid, such as acrylic acid or methacrylic acid, may be used. A content of the unsaturated carboxylic acid may, by wt %, be 6 wt % to 20 wt %, regardless of neutralization thereof.

The unsaturated carboxylic acid metal salt may refer to a metal salt the same as that of the unsaturated carboxylic acid described above. In this case, a metal of the metal salt may be provided as a monovalent metal, such as Na, Li, and potassium (K), and may be a bivalent metal, such as Zn and Mg. In general, the unsaturated carboxylic acid metal salt having a degree of neutralization of 20 wt % to 80 wt % by a metal ion described above has been commonly used.

In the meantime, an unsaturated carboxylic acid ester may be, mainly, provided as alkyl ester of the unsaturated carboxylic acid. An alkyl group thereof may have a carbon number of 1 to 10. For example, the alkyl group may include methyl, ethyl, propyl, and the like.

The polyester oligomer (A-paste) may be manufactured using a method below, and FIG. 1 schematically illustrates a process thereof.

First, a polyol including hydroxyl groups on opposing ends of the polyol having a number average molecular weight in a range of 1,000 to 2,400 may be inserted into an appropriately-sized container on which an agitator is mounted. An acrylic acid monomer or a methacrylic acid monomer (unsaturated carboxylic acid) having 2 to 3 functional groups may be added to the container to be mixed therewith.

In this case, a temperature of the polyol may be in a range of 30° C. to 40° C. The acrylic acid monomer or the methacrylic acid monomer may be added to have a ratio of 1.3 to 1.6 moles with respect to 1 mole of the polyol.

A compound of the polyol and the acrylic acid monomer or the methacrylic acid monomer may be mixed for 20 minutes to 30 minutes to be blended, and zirconia powder described above is added to the compound to be blended therewith. The zirconia powder may be added in content of 60 to 100 parts by weight with respect to 100 parts by weight of the polyol and may be agitated at a speed of 200 rpm to 300 rpm to be gradually mixed.

Subsequently, the reaction initiator may be further added to a compound including the polyol, the acrylic acid monomer or the methacrylic acid monomer, and zirconia. The reaction initiator may be provided as an organic peroxide and may be included in content of 2 to 3 parts by weight with respected to 100 parts by weight of the polyol. In this case, 50 to 60 parts by weight of an organic solvent with respect to 100 parts by weight of the polyol may be dissolved to manufacture an organic peroxide solution, and the reaction agitator may be subsequently added thereto. In this case, the organic solvent is not specifically limited, and for example, methyl ethyl ketone, toluene, or the like, may be used.

In a case in which the organic peroxide solution is added to a compound solution described above, the organic peroxide solution may be gradually added thereto, but an exemplary embodiment is not limited thereto. For example, the organic peroxide solution may be added to the compound solution for 20 minutes to 30 minutes and may be agitated to be mixed therewith.

A composition for an A-paste obtained using a method described above may be obtained, and the composition may be agitated for one hour to 1.2 hours, while a temperature thereof is gradually increased. When the temperature of the composition reaches a temperature in a range of 100° C. to 110° C., temperature rising may be stopped, and the composition may be agitated, so that the temperature of the composition may be reduced to 60° C. Subsequently, the composition may be heated for 30 minutes by agitating the composition again until the temperature of the composition reaches 105° C., and a reaction may be performed. Once the reaction is started, the reaction may be rapidly performed. Even in the case in which heat is not applied thereto, the temperature thereof is rapidly increased to 130° C. or higher.

Subsequently, in a case in which a temperature in a reactor is higher than 110° C., the temperature may be rapidly reduced to 60° C. or lower. Thus, a product having a relatively high degree of viscosity in a paste state may be obtained, thereby obtaining the polyester oligomer in the metal complex state and in the metal filled state of an exemplary embodiment.

The polyester oligomer (A-paste) obtained as above may be reacted with the ionomer resin, as illustrated in FIG. 1, thereby manufacturing a modified ionomer. The polyester oligomer (A-paste) in the metal complex state and the metal filled state, manufactured using a method described above, may be quickly reacted with the ionomer resin, but an exemplary embodiment is not limited thereto.

A reaction between the polyester oligomer and the ionomer resin will be described. 150 to 300 parts by weight of the ionomer resin with respect to 100 parts by weight of the polyester oligomer may be mixed using an appropriate mixer and may be maintained in a dryer at a temperature of 60° C. Subsequently, a residual organic solvent and residual volatile matter may be completely dried to be removed for two to four hours.

While a dried compound of the polyester oligomer and the ionomer resin is stored in an extruder on which a pelletizer is mounted at a temperature in a range of 190° C. to 240° C., the dried compound may be mixed and extruded at a rotational speed of a screw of 100 rpm to 300 rpm to pass through a nozzle, thereby manufacturing a pellet. In a process described above, the polyester oligomer and the ionomer resin may be reacted, thereby obtaining the modified ionomer.

Subsequently, a polyurethane-ionomer hybrid may be manufactured using a modified ionomer pellet described above. Hereinafter, a method of manufacturing the polyurethane-ionomer hybrid by reacting the modified ionomer pellet obtained as above and a block polyurethane prepolymer will be described. The method described above was also schematically illustrated in FIG. 1.

20 to 40 parts by weight of the block polyurethane prepolymer and 70 to 100 parts by weight of the ionomer with respect to 100 parts by weight of the modified ionomer pellet may be mixed with 1 to 10 parts by weight of a chain extender with respect to 100 parts by weight of the block polyurethane prepolymer, in order to increase a temperature thereof to 200° C. and to be agitated for one hour. Agitation described above is not specifically limited, and, for example, agitation may be performed at a rotational speed of 50 rpm to 100 rpm. Using a process described above, the modified ionomer may be reacted with the block polyurethane prepolymer.

A block polyurethane prepolymer deblocked to be activated in a case in which the block polyurethane prepolymer reaches the dissociation temperature may be used as the blocked polyurethane prepolymer. A hybridization reaction between the modified ionomer and the block polyurethane prepolymer may be started at a temperature at which the isocyanate is activated. However, the isocyanate may be heated at a temperature in a range of 150° C. to 200° C. so that fluidity of the ionomer may be secured, and the modified ionomer and the block polyurethane prepolymer may be effectively mixed to be reacted.

The block polyurethane prepolymer used in an exemplary embodiment may be provided as a block polyurethane prepolymer in which an isocyanate on opposing ends of polyurethane obtained by a reaction between the polyol and the isocyanate is blocked by phenol, ε-caprolactam, 1,2,4-triazole, pyrazole, acetone oxime, cyclohexanone oxime, methyl ethyl ketoxime (MEKO), a dialkyl malonate, a hydroxamic acid ester, or the like.

Thus, the block polyurethane prepolymer used in manufacturing the polyurethane-ionomer hybrid resin of an exemplary embodiment may be manufactured in such a manner that the polyol and the isocyanate are reacted. In this case, the polyol and the isocyanate may be reacted to have a mole ratio of about 1:1.2 to 1:1.5, so that an end of the block polyurethane prepolymer may be induced to an isocyanate group, and the isocyanate group on an end thereof may be deactivated by a blocking agent. As such, the polyurethane-ionomer hybrid resin manufactured using the block polyurethane prepolymer in which the isocyanate group on an end thereof is deactivated by the blocking agent may not be activated at room temperature. However, the blocking agent of the isocyanate group on an end thereof may be dissociated at a temperature at which fluidity of the ionomer is sufficiently secured. Thus, the isocyanate group on an end thereof may be activated again on a temperature condition that agitation and mixing is effectively performed. Thus, the isocyanate group may form a urethane bond with a hydroxyl group (—OH) in the ionomer, thereby manufacturing a hybrid material in which the urethane bond is uniformly distributed.

In addition, the polyol acting as a soft segment of the polyurethane in the polyurethane-ionomer hybrid resin of an exemplary embodiment may be provided as a diol, such as ethylene glycol, neopentyl glycol, propylene glycol, hexylene glycol, 1,6-hexanediol, triethylene glycol, and bisphenol A; a polyester polyol consisting of polyfuntional alcohol, such as glycerol, as well as trimethylpropionic acid, benzoic acid, adipic acid, phthalic acid, isophthalic acid, or the like; hydroxyl acrylate, such as hydroxyethyl acrylate, hydroxyethyl methacrylate, and hydroxybutyl acrylate; and a polyether polyol, such as polytetramethylene ether glycol (PTMEG).

In addition, as the isocyanate acting as a hard segment of the polyurethane, an aromatic isocyanate, such as diphenylmethane diisocyanate (MDI), toluene diisocyanate (TDI), naphthalene diisocyanate (NDI), tolidine diisocyanate (TODI), and p-phenylene diisocyanate (PPDI), may be used, and an aliphatic isocyanate, such as hexamethylene diisocyanate (HDI), isophorone diisocyanate (IPDI), and 4,4'-dicyclohexylmethane diisocyanate (H12MDI), may also be used.

In order to prevent yellowing of the golf ball cover over time, a non-yellowing type aliphatic isocyanate may be used as the isocyanate, rather than the aromatic isocyanate vulnerable to yellowing.

In addition, as a chain extender of the polyurethane, ethylene glycol, 1,4-butanediol, ethylene diamine, hexamethylene diamine, or the like, may be further included.

In order to use the polyurethane-ionomer hybrid resin that has been manufactured as the golf ball cover, various additives, such as a white pigment or a pigment of different colors, an antioxidant, an anti-aging agent, or an inorganic filler including a metal, may be mixed according to need, and a pellet may be manufactured using a method described above. A process described above corresponds to Operation 4 of FIG. 1.

A pellet obtained using the process described above may be appropriately used as a resin composition for a golf ball cover. In this case, the additives may be selected according to need, but are not necessarily added thereto.

A golf ball having driving distance and rotational force simultaneously secured therein may be obtained in such a manner that the resin composition provided in an exemplary embodiment is used as a material for the golf ball cover. In a case in which the resin composition provided in an exemplary embodiment is used, a single layer cover or a dual layer cover may be formed on an external side of a single core or a dual core by the resin composition for a golf ball cover, thereby manufacturing a 2-piece, 3-piece, or 4-piece golf ball.

The golf ball including the polyurethane-ionomer hybrid material as a single layer cover may have the same characteristics as those of a golf ball of the related art, having the dual layer cover structure including polyurethane and the ionomer. The golf ball may improve golfers' performance, since the golf ball has a relatively long driving distance when the golf ball is hit using a golf driver, excellent control performance due to excellent backspin performance when the golf ball is hit using a short iron, and a relatively high degree of durability secured therein.

EXEMPLARY EXAMPLE

Hereinafter, an exemplary embodiment will be described in more detail, using Exemplary Example. Exemplary Example below is provided as an example of an exemplary embodiment, but an exemplary embodiment is not limited thereto.

Exemplary Examples 1 to 4

A polyester oligomer, a modified ionomer, and a polyurethane-ionomer resin were manufactured, respectively, according to a composition of Table 1.

Operation 1: Manufacturing Polyester Oligomer

Polytetramethylene ether glycol (PTMEG) (a number average molecular weight of 2000) at a temperature of 35° C. was inserted into a container on which an agitator was mounted and was mixed with SR-350 and SR-297 to be agitated for 30 minutes. Zirconia powder was added to RTMEG and was agitated at a speed of 300 rpm to be slowly mixed therewith.

Trigonox 29-40N-pd as an organic peroxide was dissolved in methyl ethyl ketone as an organic solvent to be agitated and mixed while a small amount of compound of PTMEG and the zirconia powder was added thereto for 20 minutes.

Subsequently, while a temperature thereof was gradually increased, and agitation was performed for one hour, the temperature thereof was increased to 100° C. Subsequently, after the temperature thereof was reduced to 60° C., and agitation was performed, agitation was performed again for 30 minutes, and the temperature thereof was increased to 105° C. From this point, a reaction was rapidly performed, and the temperature thereof was also rapidly increased.

When the temperature thereof was 130° C. or higher, agitation was performed, and the temperature thereof was rapidly reduced to 60° C. or lower. Thus, the polyester oligomer in a paste state having a relatively high degree of viscosity was obtained.

Operation 2: Manufacturing Primary Pellet of Modified Ionomer

The polyester oligomer (A-paste) that has been obtained was mixed with an ionomer resin, such as Surlyn 8320, Surlyn 9150, and HPC AD 1022, using a mixer and was stored in a dryer at a temperature of 60° C. for four hours. Subsequently, a residual organic solvent and a residual volatile matter were completely dried to be removed.

A dried compound of A-paste and the ionomer resin was mixed and reacted in an extruder on which a pelletizer was mounted at a temperature of 220° C. at a screw rotational speed of 250 rpm to pass through a nozzle and to be cooled, thereby manufacturing a primary pellet of a modified ionomer.

Operation 3: Manufacturing Polyurethane-Ionomer Hybrid

The primary pellet of the modified ionomer was mixed with block polyurethane prepolymers (BPUR-2000, BPUR-2001, and BPUR-2002), 1,4-butanediol, an ionomer, such as Surlyn 8320 and Surlyn 9150, an antioxidant and a thermal stabilizer, such as Irganox 1010 and Irganox 1076, and $TiO_2$, and a temperature thereof was increased to 200° C., which were agitated at a speed of 100 rpm for one hour and reacted.

Thus, a polyurethane-ionomer hybrid resin composition was manufactured.

Operation 4: Manufacturing Polyurethane-Ionomer Hybrid Pellet

The polyurethane-ionomer hybrid resin composition that has been manufactured was mixed and reacted in the extruder on which the pelletizer was mounted at a temperature of 220° C. at a rotational speed of a screw of 250 rpm to pass through a nozzle and to be cooled, thereby manufacturing a pellet.

The polyurethane-ionomer hybrid resin composition was injection molded as a material for a golf ball cover using the pellet, thereby manufacturing a golf ball. As a core used in manufacturing the golf ball, a single core, a hardened material of polybutadiene rubber (PBR) having a diameter of 38.6 mm was used. An overall weight of the golf ball was 45.5±0.01 g, a diameter thereof was 42.72 mm, and a thickness of a hybrid single layer cover was 2.06 mm.

Characteristics of the golf ball that has been manufactured were evaluated, and results thereof are illustrated in Table 2.

Comparative Example 1

Characteristics of a urethane golf ball of the related art including a dual layer cover (an external cover (urethane)+ an inner cover (an ionomer)) were evaluated based on the same categories as those of Exemplary Example.

In Comparative Example 1, a golf ball having the same core of the Exemplary Example was used, an overall weight of the golf ball was 45.5±0.01 g, and a diameter thereof was 42.72 mm, the same as that of Exemplary Example. In this case, the golf ball was manufactured in such a manner that a thickness of the external cover was 0.88 mm, a thickness of the inner cover was 1.18 mm, and a thickness of an overall cover thereof was 2.06 mm.

Characteristics of the golf ball that has been manufactured were evaluated, and results thereof are illustrated in Table 2.

TABLE 1

| Classification | Component | Exemplary Example No. (Content. Part by Weight) | | | |
|---|---|---|---|---|---|
| | | 1 | 2 | 3 | 4 |
| Polyester Oligomer | PTMEG (1*) | 500 | | | |
| | SR-350 (2*) | 100 | | | |
| | SR-297 (3*) | 100 | | | |
| | Zirconia PG3 (4*) | 500 | | | |
| | Trigonox 29-40B-pd (5*) | 10 | | | |
| Primary Pellet | A-paste | 100 | | | |
| | Surlyn 8320 (6*) | 160 | | | |
| | Surlyn 9150 (7*) | 80 | | | |
| | HPC AD 1022 (8*) | 100 | | | |
| Polyurethane-Ionomer Hybrid Pellet | Primary Pellet | 100 | 100 | 100 | 100 |
| | BPUR-2000 (9*) | 50 | — | — | — |
| | BPUR-2001 (10*) | — | 50 | — | 25 |
| | BPUR-2002 (11*) | — | — | 50 | 25 |
| | 1,4-butanediol | 4 | 4 | 4 | 4 |
| | Surlyn 8320 | 50 | 50 | 50 | 50 |
| | Surlyn 9150 | 50 | 50 | 50 | 50 |
| | TiO$_2$ (12*) | 6 | 6 | 6 | 6 |
| | Irganox 1010 (13*) | 0.6 | 0.6 | 0.6 | 0.6 |
| | Irganox 1076 (14*) | 0.6 | 0.6 | 0.6 | 0.6 |

(1*) PTMEG
A product by Korea PTG Co., Ltd., a type of polyol, and a polytetramethylene ether glycol including hydroxyl groups on opposing ends thereof.
(2*) SR-350
A product by Sartomer Americas, a U.S. company and a type of methacrylic monomer having 3 functional groups, having a product name of trimethylolpropane trimethacrylate having a number average molecular weight of 338.
(3*) SR-297
A product by Sartomer Americas, a U.S. company and a type of methacrylic monomer having 3 functional groups, having a product name of 1,3-butylene glycol dimethacrylate having a number average molecular weight of 226.
(4*) Zirconia PG3
A product by Insung Powder Tech Co., LTD. and a type of pulverulent body of Zirconia (ZrO$_2$), having a name of a product manufactured in such a manner that yttria (Y$_2$O$_3$) was added, and a crystal structure thereof is partially stabilized.
(5*) TRIGONOX 29-40B-pd
A product by Akzo Nobel, a Dutch multinational company and a type of organic peroxide, a product manufactured by being mixed with silica (SiO$_2$) and stabilized, having a product name of 1,1-di-tert-butylperoxy-3,3,5-trimethylcyclohexane including 40% peroxide.
(6*) Surlyn 8320
A product by DuPont, a U.S. company and a type of ionomer resin, having a product name of a sodium (Na) ion neutralization type soft resin.
(7*) Surlyn 9150
A product by DuPont, a U.S. company and a type of ionomer resin, having a product name of a zinc (Zn) ion neutralization type hard resin.
(8*) HPC AD 1022
A product by DuPont, a U.S. company and a type of ionomer resin, having a product name of Zn ion neutralization type soft resin.
(9*) BPUR-2000
A block polyurethane prepolymer deactivated using a blocking agent dissociated at a relatively high temperature after a polyol is reacted with an isocyanate and including COOH groups.
(10*) BPUR-2001
A block polyurethane prepolymer deactivated using a blocking agent dissociated at a relatively high temperature after a polyol is reacted with an isocyanate and including COOH groups.
(11*) BPUR-2002
A block polyurethane prepolymer deactivated using a blocking agent dissociated at a relatively high temperature after a polyol is reacted with an isocyanate and not including COOH groups.
(12*) TiO$_2$ (Titanium Oxide)
A white inorganic pigment.
(13*) Irganox 1010
A product by Ciba Specialty Chemicals Inc. and a type of antioxidant and thermal stabilizer, having a product name of pentaerythritol-tetrakis {3-(3,5-di-tert-butyl-4-hydroxyphenyl)-propionate.
(14*) Irganox 1076
A product by Ciba Specialty Chemicals Inc. and a type of antioxidant and a thermal stabilizer, having a product name of octadecyl-3-(3, 5-di-tert-butyl-4-hydroxyphenyl)-propionate.

TABLE 2

| Characteristics | Exemplary Example | | | | Comparative Example |
|---|---|---|---|---|---|
| | 1 One Core + Two Covers | 2 | 3 | 4 One Core + One Cover | 1 One Core + Two Covers |
| Hardness of Cover Surface (shore D) (15*) | 57 | 54 | 52 | 55 | 58 |
| Driving Distance (yards) (16*) | 240 | 235 | 230 | 237 | 225 |
| Spin of 5-Iron (RPM) (17*) | 4600 | 4650 | 4740 | 4570 | 4300 |
| Spin of 9-Iron (RPM) (18*) | 7370 | 7420 | 7460 | 7390 | 7150 |
| Durability (19*) | ◉ | ◉ | ○ | ◉ | ○ |
| Sensation of Hitting Golf Ball (20*) | ○~◉ | ○~◉ | ○~◉ | ○~◉ | ○ |

(15*) Hardness of Cover Surface (Shore D)
Hardness measured by a test method using a hardness measuring instrument by Zwick, a German company, according to DIN 53505, the German industrial standard, and representing hardness of a surface of a golf ball cover, which is relatively high when a value thereof is high.
(16*) Driving Distance (Yard)
An overall distance of driving distance of a golf ball and ball rolling distance measured using a mechanical golfer, Iron Byron, a product by True Temper, a U.S. company, when the golf ball is hit by a titanium (Ti) driver having a loft angle of 10.5° at a head speed of 43 m/sec., in a unit of yards.
(17*) Spin of 5-Iron (RPM)
A test result by capturing an image of spin of a golf ball measured using the same mechanical golfer as in the case of Driving Distance in note 16*, when the golf ball is hit by a 5-Iron having a loft angle of 30° at a head speed of 36 m/sec., referring to a number of revolutions per minute.
(18*) Spin of 9-Iron (RPM)
A test result by capturing an image of spin of a golf ball measured using the same mechanical golfer as in a case of Driving Distance in note 16*, when the golf ball is hit by a 9-Iron having a loft angle of 45° at a head speed of 30 m/sec., referring to a number of revolutions per minute.
(19*) Durability
Evaluation of damage to a golf ball, conducted in such a manner that a golf ball was shot to be hit, 50 times, against the head of a golf club fastened to a steel plate having a thickness of 2 cm and disposed 2.54 m to the front thereof, with 1.6 kg/cm of pressure of compressed air, using Air Cannon, a golf ball shooting device by Automated Design Corp, a U.S. company, based on criteria below.
◉: A state in which a surface of a golf ball is slightly scratched, and markings are present.
○: A state in which a surface of a golf ball is roughened, and markings are destroyed.
Δ: a state in which a golf ball cover is significantly damaged.
X; A state in which a golf ball cover is broken.
(20*) Sensation of Hitting Golf Ball
Sensation of hitting a golf ball was evaluated by five professional golfers after playing golf on a golf course. Evaluation results are illustrated using the following symbols.
◉: Excellent,
○: Good,
Δ: Satisfactory,
X: Unsatisfactory As illustrated in Table 2, it can be confirmed that a golf ball manufactured using a polyurethane-ionomer hybrid cover composition according to an exemplary embodiment have relatively long driving distance when the golf ball is hit using a golf driver, excellent backspin performance when the golf ball is hit using a short iron, and having excellent durability secured therein, as compared with a golf ball having cover hardness similar thereto, when compared with a golf ball (Comparative Example) of the related art, including a dual layer cover.

As set forth above, according to an exemplary embodiment, a golf ball having a single layer cover manufactured using a polyurethane-ionomer hybrid material may have relatively long driving distance when the golf ball is hit using a golf driver, excellent backspin performance when the golf ball is hit using a short iron, a soft sensation when being hit, as well as durability, secured therein.

While exemplary embodiments have been shown and described above, it will be apparent to those skilled in the art that modifications and variations could be made without departing from the scope of the present invention as defined by the appended claims.

What is claimed is:

1. A golf ball, comprising:
    a core; and
    a cover on an external side of the core,
    wherein the cover is formed of a polyurethane-ionomer hybrid resin composition comprising:
    100 parts by weight of a modified ionomer obtained by reacting:
    a) a polyester oligomer having a zirconia complex state or a zirconia filled state which is provided as a reaction product generated by a reaction among i) a polyol having a number average molecular weight in a range of 1,000 to 2,400, including hydroxyl groups on opposing ends of the polyol, ii) a monomer of acrylate or methacrylate having 2 functional groups, and iii) zirconia; and
    b) an ionomer resin having units derived from unsaturated carboxylic acid,
    wherein the modified ionomer resin is prepared by neutralizing a part of the unneutralized portion of the unit derived from unsaturated carboxylic acid of ionomer resin with zirconium of the polyester oligomer and by addition polymerization of the neutralized ionomer resin with polyester oligomer;
    20 to 40 parts by weight of a block polyurethane prepolymer with respect to 100 parts by weight of the modified ionomer;
    70 to 100 parts by weight of an ionomer with respect to 100 parts by weight of the modified ionomer; and
    1 to 10 parts by weight of a chain extender with respect to 100 parts by weight of the block polyurethane prepolymer.

2. The golf ball of claim 1, wherein the polyol is at least one selected from the group consisting of a polyester diol obtained by polycondensation of at least one dibasic acid selected from the group consisting of adipic acid and sebacic acid and at least one diol selected from the group consisting of ethylene glycol, propylene glycol, butanediol, and hexanediol, or interesterification; a polyether diol obtained by undergoing addition reaction of an epoxide with at least one selected from the group consisting of ethylene oxide and butylene oxide; polyalkylene oxide (an alkylene included in the polyalkylene oxide has a carbon number of 2 to 4); a polytetramethylene ether glycol obtained by polymerization of tetrahydrofuran; a modified polyether diol in which the polyether diol or the polytetramethylene ether glycol is modified with acrylonitrile; a polyoxyethylene diol; a polycaprolactone diol; and a polycarbonate diol.

3. The golf ball of claim 1, wherein the zirconia is provided as zirconia in which at least one selected from the group consisting of yttrium oxide ($Y_2O_3$), calcium oxide (CaO) and magnesium oxide (MgO) is added to zirconium oxide ($ZrO_2$) to partially stabilize a crystal structure of the zirconia.

4. The golf ball of claim 1, wherein the zirconia is provided as powder having a particle size of 250 mesh or less.

5. The golf ball of claim 1, wherein the zirconia includes 0.01 wt % to 2 wt % of hafnium oxide ($HfO_2$).

6. The golf ball of claim 1, wherein the block polyurethane prepolymer is provided as a block polyurethane prepolymer in which an isocyanate on opposing ends of a polyurethane obtained by a reaction between a polyol and the isocyanate is blocked by at least one selected from the group consisting of a phenol, ε-caprolactam, 1,2,4-triazole, pyrazole, acetone oxime, cyclohexanone oxime, methyl ethyl ketoxime (MEKO), dialkyl malonate (an alkyl group included in the dialkyl malonate has a carbon number of 1 to 3), and a hydroxamic acid ester.

7. The golf ball of claim 6, wherein the block polyurethane prepolymer is obtained in such a manner that the polyol and the isocyanate are reacted to have a mole ratio in a range of 1: 1.2 to 1:1.5.

8. The golf ball of claim 6, wherein the block polyurethane prepolymer includes at least one soft segment selected from a diol selected from the group consisting of ethylene glycol, neopentyl glycol, propylene glycol, hexylene glycol, 1,6-hexanediol, triethylene glycol, and bisphenol A; a polyfuntional alcohol of glycerol; hydroxyacrylate selected from the group consisting of hydroxyethyl acrylate, hydroxyethyl methacrylate, and hydroxybutyl acrylate; and a polyether polyol of polytetramethylene ether glycol (PTMEG).

9. The golf ball of claim 6, wherein the block polyurethane prepolymer includes at least one hard segment selected from an aromatic isocyanate selected from the group consisting of diphenylmethane diisocyanate (MDI), toluene diisocyanate (TDI), naphthalene diisocyanate (NDI), tolidine diisocyanate (TODI), and p-phenylene diisocyanate (PPDI); and an aliphatic isocyanate selected from the group consisting of hexamethylene diisocyanate (HDI), isophorone diisocyanate (IPDI), and 4,4'-dicyclohexylmethane diisocyanate (H12MDI).

10. The golf ball of claim 1, wherein the chain extender is at least one selected from-the group consisting of ethylene glycol, 1,4-butanediol, ethylene diamine, and hexamethylene diamine.

11. The golf ball of claim 1, wherein the cover is provided as a single layer cover, a dual layer cover, or a triple layer cover.

* * * * *